Feb. 6, 1934.   E. J. BLOOM   1,945,513
LUBRICATING FIXTURE
Original Filed May 19, 1922   2 Sheets-Sheet 1
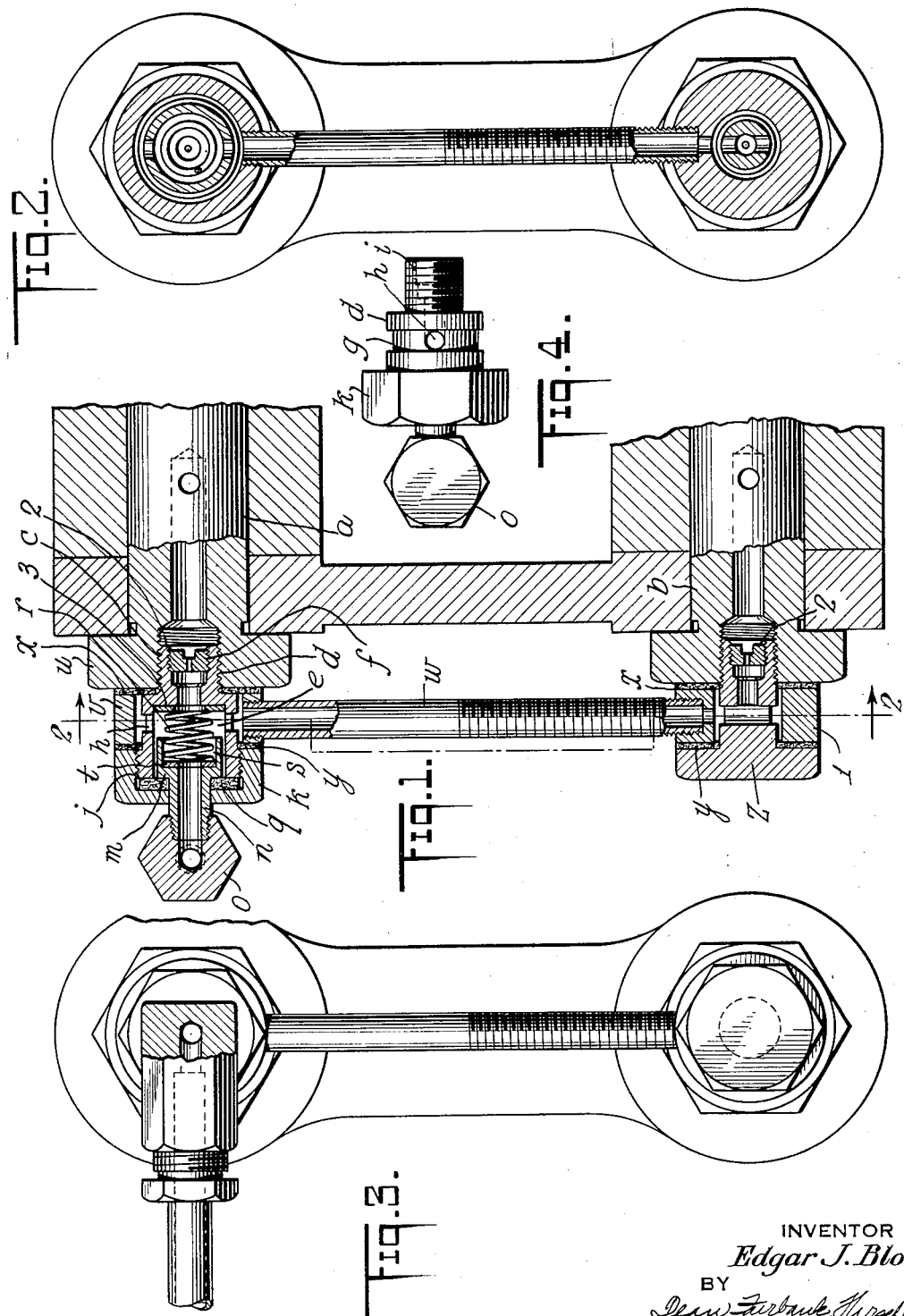
INVENTOR
*Edgar J. Bloom*
BY
ATTORNEYS

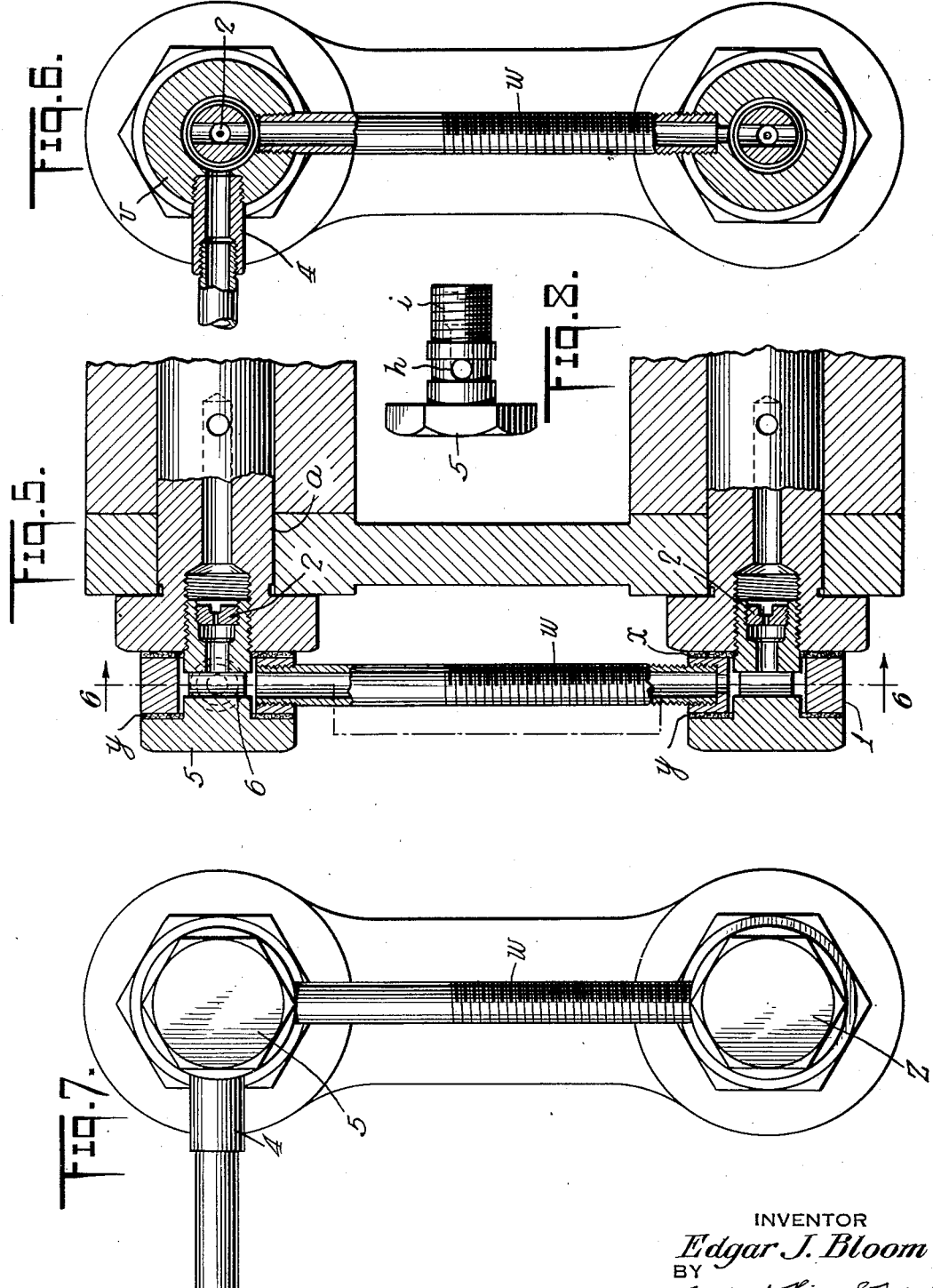

Patented Feb. 6, 1934

1,945,513

UNITED STATES PATENT OFFICE 1,945,513

LUBRICATING FIXTURE

Edgar J. Bloom, Tiffin, Ohio, assignor, by mesne assignments, to Auto Research Corporation, a corporation of Delaware Original application May 19, 1922, Serial No. 562,060, now Patent No. 1,764,774, dated June 17, 1930. Divided and this application June 16, 1930. Serial No. 461,608

1 Claim. (Cl. 184—7)

This invention relates to a lubricating fixture for use in connection with lubricating system used to distribute a lubricant from a single source to a plurality of bearings located, some of them, on parts which have relative movements with respect to the parts on which is located the source of lubricant. We have in mind in particular the lubrication of a chassis frame and running gear of an automobile from a single source.

It is the particular object of this invention to provide for the lubrication of substantially unitary chassis elements having a plurality of bearings, some of which may be at higher levels than others, and particularly to provide for the lubrication of the spring shackle element, which may be provided with two or more shackle bolts positioned at substantially different elevations.

In the drawings:—

Figure 1 is a view largely in section of a portion of two shackle bolts showing the connecting fixture;

Figure 2 is a section on line 2—2 of Figure 1;

Figure 3 is a side elevation taken from the left of Figure 1;

Figure 4 is a detail of the special stud and swivel which screws into the end of the shackle bolt; and Figures 5, 6, 7 and 8 are similar views of a modified form of the same generic invention.

Referring to Figure 1, $a$ designates the upper shackle bolt, $b$ the lower shackle bolt. The upper shackle bolt ordinarily at the present time turns in the eye of a stationary member, which is either part of the chassis frame or else a permanent fixture. The end of this shackle bolt is bored and tapped as at $c$ to take a special stud $d$, as detailed in Figure 4. This stud is a screw machine product, having a larger bore $e$ and a smaller bore $f$. On the outside it has an annular groove $g$ connected with the larger inner bore $e$ by port $h$. The inner end is of a reduced diameter and is externally threaded as at $i$. The outer end is of larger diameter and is threaded as at $j$. The cap nut $k$ is arranged to screw onto the exterior after the swivel plunger $m$ has been inserted in the bore of the larger diameter. This plunger is provided with a neck portion $n$ which screws into a pipe tapped cavity in the hexagonal coupling $o$. The neck $n$, the plunger $m$ and the coupling $o$ form a swivel coupling. A packing ring $q$ is inserted in between the cap nut $k$ and the top of the plunger m and a coiled spring $r$ ordinarily forces the plunger $m$ up against this packing to make the same liquid tight. This spring $r$ is centered by engaging in the bored end $s$ of the plunger against a wear plate $t$.

Between the cap nut $k$ and the head $u$ of the shackle bolt is a ring $v$ provided with a port into which screws the hollow rod $w$. Fiber washers $x$ and $y$ engage between the cap nut, the ring and the head of the bolt. By screwing the cap nut tightly against the fiber washers a liquid tight joint can be obtained. This hollow rod $w$ will oscillate slightly due to its connection with the lower shackle bolt $b$, which will always move slightly around the axis of the upper shackle bolt by reason of the two being connected together by shackles or links 12 (see Figures 9 and 10). The lower end of the hollow rod $w$ screws into the ring 1, which engages between the head of the stud $z$ and the head of the shackle bolt $b$ in precisely the same way as the ring $v$ at the other end is seated with this exception, that the stud $z$ has an integral head and requires no cap nut arrangement to house a portion of the swivel coupling. In each stud there is a screw plug 2 with a metering port. The size of drilling is calculated to feed the proper amount of oil to comport with the requirements of each shackle bolt. In the upper stud a wear plate 3 is provided between the chamber of larger bore $e$ and the chamber of the smaller bore $f$.

A modified form of the generic invention is shown in the remaining figures. In Figures 5 to 8 inclusive, in place of a swivel coupling to connect with the source of a lubricant, a rigid coupling is provided by the sleeve 4. Hence the stud 5 with a solid head may be used very similarly to the stud used in connection with the lower shackle bolt in the figures heretofore described.

In Patent No. 1,632,767, issued June 14, 1927, I have claimed and described the general system of lubrication of which this is a part. In that application it is stated that the main conduit ordinarily contains oils and the passageway to each bearing is provided with a metered orifice which restrains the flow of oil and which permits lubrication of the bearing by sucking action, due to relative movement of its parts and also due to a capillary attraction because of the presence of the fluid in the bearing, to draw the oil through the metered opening in accordance with the need of the bearings. It is stated also in that application that the proper feed is achieved by keeping the oil mains substantially air-tight so that the oil will not feed by gravity.

The present application is a division of the application of Edgar J. Bloom, filed May 19th, 1922, #562,060, which has become Patent No. 1,764,774 issued June 17, 1930, and it is particularly directed to the means for conducting and supplying lubricant in parallel to, and dividing it between, the various bearings of pivoting chassis elements, particularly those provided with one or more bolt structures forming an interior bearing surface and a plurality of bearing sleeves embracing parts of said bolt structures (either said bearing sleeves turning upon said bolt structure, or structures or said bolt structure or structures turning within said bearing sleeves, or both), said bearing sleeves being usually positioned at substantially different levels, such as spring shackles and the like.

Although in the preferred embodiment orificial flow restrictions are employed, under certain conditions other flow restricting or flow regulating devices may be employed.

It is to be understood that there may be many changes and modifications made in the construction and the arrangement of the details of my invention without departing from the scope thereof, and I intend to include all such variations as fall within the scope of the appended claims in this application, in which only the preferred forms of my invention have been disclosed.

What I claim is:—

A spring shackle element comprising in combination a pair of bolts, link members connecting said bolts, a fitting for supplying lubricant thereto, one of said links having a longitudinal passage communicating with said fitting and leading to the other of said bolts and flow metering restriction plugs connected to said bolts and in the line of flow to each of the bolts, the ends of said bolts being provided with tapped sockets and said plugs being screwed thereinto in lubricant tight manner, each of said plugs being provided with a central opening, a metering element in said central opening and lubricant passageways extending from the inner ends of said tapped sockets to central portions of the peripheral surfaces of said bolts.

EDGAR J. BLOOM.